(12) United States Patent
Barake et al.

(10) Patent No.: US 7,631,126 B2
(45) Date of Patent: Dec. 8, 2009

(54) SYSTEM AND METHOD FOR INTERFACING AN ELECTRONIC DEVICE WITH A HOST SYSTEM

(75) Inventors: Omar Barake, Waterloo (CA); Michael Goldsmith, Kitchener (CA); Maxime Matton, Waterloo (CA); Jerry Mailloux, Waterloo (CA); Robert Wood, Waterloo (CA); Lyall Winger, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 211 days.

(21) Appl. No.: 11/753,194

(22) Filed: May 24, 2007

(65) Prior Publication Data

US 2008/0294923 A1 Nov. 27, 2008

(51) Int. Cl.
*G06F 13/42* (2006.01)
*G06F 3/00* (2006.01)

(52) U.S. Cl. ............... 710/105; 710/8; 710/11; 710/14; 710/60

(58) Field of Classification Search ........ 710/8, 710/10–11, 14, 58, 60, 301–302, 105–106; 713/300, 320, 322, 340
See application file for complete search history.

(56) References Cited

U.S. PATENT DOCUMENTS

| | | | | |
|---|---|---|---|---|
| 5,230,071 A | * | 7/1993 | Newman | 710/60 |
| 5,987,617 A | * | 11/1999 | Hu et al. | 713/320 |
| 6,279,060 B1 | | 8/2001 | Luke et al. | |
| 6,611,552 B2 | * | 8/2003 | Beck | 375/219 |
| 6,738,834 B1 | * | 5/2004 | Williams et al. | 710/8 |
| 6,839,778 B1 | * | 1/2005 | Sartore et al. | 710/60 |
| 7,069,347 B1 | * | 6/2006 | Kolokowsky | 710/8 |
| 7,072,989 B1 | * | 7/2006 | Kolokowsky et al. | 710/8 |
| 2002/0075529 A1 | * | 6/2002 | Sato et al. | 358/505 |
| 2002/0162036 A1 | * | 10/2002 | Kim et al. | 713/300 |
| 2003/0054703 A1 | * | 3/2003 | Fischer et al. | 439/894 |
| 2005/0066087 A1 | | 3/2005 | Wu | |
| 2006/0053244 A1 | | 3/2006 | Fruhauf et al. | |
| 2007/0118674 A1 | * | 5/2007 | Ulenas | 710/305 |

FOREIGN PATENT DOCUMENTS

| | | |
|---|---|---|
| EP | 1775652 A1 | 10/2005 |
| WO | WO 99/08196 A | 2/1999 |
| WO | WO 03/107199 A | 12/2003 |

OTHER PUBLICATIONS

"Universal Serial Bus Specification Revision 2.0", USB Implementers Forum, Apr. 27, 2000.

* cited by examiner

*Primary Examiner*—Thomas J Cleary
(74) *Attorney, Agent, or Firm*—McCarthy Tétrault LLP (57) ABSTRACT

The invention relates to a system and method for controlling interfacing parameters for a device when connected to a host is provided. The method comprises: monitoring for an initial connection by the device to the host; then, while the device is establishing the connection with the host, utilizing a communication bus controller contained in a microprocessor in the device to process communications with the host at a first data transmission rate; and after a predetermined condition, re-establishing the connection with the host using a second bus controller in the device that processes the communications at a second transmission rate that is higher the first data transmission rate.

20 Claims, 5 Drawing Sheets

SYSTEM AND METHOD FOR INTERFACING AN ELECTRONIC DEVICE WITH A HOST SYSTEM

The invention described herein relates to a system and method for interfacing an electronic device with a host system. In particular, it relates to providing an interface to allow a device to selectively provide power to its components when it is connected to the host system through the bus, such as a Universal Serial Bus (USB).

BACKGROUND

Portable handheld mobile communication devices perform a variety of functions to enable mobile users to stay organized and in contact with others through e-mail, schedulers and address books. Many of these devices have wireless communication capabilities. As in the case with portable devices, they have a self-contained power supply. Power to such a device can be provided through a stand-alone docking station. Additionally, power can be provided by connecting the device to a host system through an interface. Some interfaces may have current draw limitations when a device is connected to it. Such limitations affect the ability of the device to both recharge its battery and provide full operation of its features (e.g. its applications).

There is a need for a system and method which addresses deficiencies in the prior art.

BRIEF DESCRIPTION OF THE DRAWINGS

Embodiments of the invention will now be described, by way of example only, with reference to the accompanying drawings, in which.

DETAILED DESCRIPTION OF AN EMBODIMENT

The description which follows and the embodiments described therein are provided by way of illustration of an example or examples of particular embodiments of the principles of the present disclosure. These examples are provided for the purposes of explanation and not limitation of those principles and of the invention. In the description which follows, like parts are marked throughout the specification and the drawings with the same respective reference numerals.

In a first aspect, a method for controlling interfacing parameters for a device when connected to a host is provided. The method comprises: monitoring for an initial connection by the device to the host; then, while the device is establishing the connection with the host, utilizing a communication bus controller contained in a microprocessor in the device to process communications with the host at a first data transmission rate; and after a predetermined condition, re-establishing the connection with the host using a second bus controller in the device that processes the communications at a second transmission rate that is higher than the first data transmission rate.

In a second aspect, a method for controlling interfacing parameters for a device when connected to a host is provided. The method comprises: establishing an initial connection by the device to the host; conducting negotiations from the device to the host to set a first data transmission rate for the device for the initial connection utilizing a communication bus controller contained in a microprocessor; and after detecting a predetermined condition, re-establishing the connection with the host using a second bus controller in the device that processes the communications at a second transmission rate that is higher the first data transmission rate.

In the method, while the device is establishing the connection: signals from the connection may be used to charge a battery of the device; and the microprocessor may operate in a low power mode.

In the method, the predetermined condition may be the charging of the battery to a predetermined level.

In the method, when the connection is re-established, the microprocessor may operate in a higher power mode than the low-power mode.

In the method, the bus may be a USB bus, the first data transmission rate may be a full speed USB rate, the predetermined condition may be completion of enumeration of the device to the host, and the second data transmission rate may be a high speed USB rate.

In the method, the second bus controller may be external to the microprocessor.

In the method, the negotiations may comprise: initiating a command to simulate an attachment to the host; and identifying the device to the host as being capable of communicating at the first data transmission rate.

In the method, the negotiations may further comprise initiating at the host an enumeration process with the device by establishing a configuration for the device to allow the device to terminate the enumeration process.

In the method, if the predetermined condition is satisfied, the device may initiate a command to simulate a detachment from the host, may initiate a command to simulate an attachment to the host and may identify itself to the host as being capable of communicating at the second data transmission rate.

The method may further comprise a second process to enumerate the connection from the second data transmission rate to the first data transmission rate, where the second process is initiated upon satisfaction of a second predetermined condition.

In the method, the second process may comprise: initiating a command to simulate a detachment by the device from the host; initiating a command to simulate an attachment to the host; and identifying the device to the host as being capable of communicating at the first data transmission rate.

In a third aspect, a system for interfacing communications for a device when connected to a host is provided. The system comprises: a first bus controller to process the communications between the device and the host at a first data transmission rate; a second bus controller to process the communications a second transmission rate that is higher the first data transmission rate; a module to monitor for an initial connection by the device to the host; and a controller module that activates the first bus controller while the device is establishing the connection with the host and after a predetermined condition, activates the second bus controller.

The system may further comprise a battery charging module to charge a battery powering the device, wherein while the device is establishing the connection, signals from the connection may be used to charge the battery of the device and the microprocessor may operate in a low power mode.

In the system, the predetermined condition may be the charging of the battery to a predetermined level and when the connection is re-established, the microprocessor may operate at a higher power mode than the low-power mode.

In the system, the bus may be a USB bus, the first data transmission rate may be a full speed USB rate, the predetermined condition may be completion of enumeration of the device to the host and the second data transmission rate may be a high speed USB rate.

In the system, the controller module may initiate negotiations comprising: initiating a command to simulate an attachment to the host; and identifying the device to the host as being capable of communicating at the first data transmission rate.

In the system, the negotiations may further comprise initiating at the host an enumeration process with the device by establishing a configuration for the device to allow the device to terminate the enumeration process.

In the system, if the predetermined condition is satisfied the controller module may initiate a command to simulate a detachment from the host, may initiate a command to simulate an attachment to the host and may identify the device to the host as being capable of communicating at the second data transmission rate.

In the system, the controller module may further initiate a second process to enumerate the connection from the second data transmission rate to the first data transmission rate, where the second process may be initiated upon satisfaction of a second predetermined condition.

In the system, the second process may comprise: initiating a command to simulate a detachment by the device from the host; initiating a command to simulate an attachment to the host; and identifying the device to the host as being capable of communicating at the first data transmission rate.

In other aspects, various combinations of sets and subsets of the above aspects are provided.

Generally, an embodiment provides a system and method for controlling a bus interface of a portable device that is connected to a host computer (or device) to allow for improved power management for the device.

Exemplary details of embodiments are provided herein. First, a description is provided on general concepts and features of an embodiment and related bus management system(s). Then, further detail is provided on exemplary bus management systems related to an embodiment.

Figure 1:
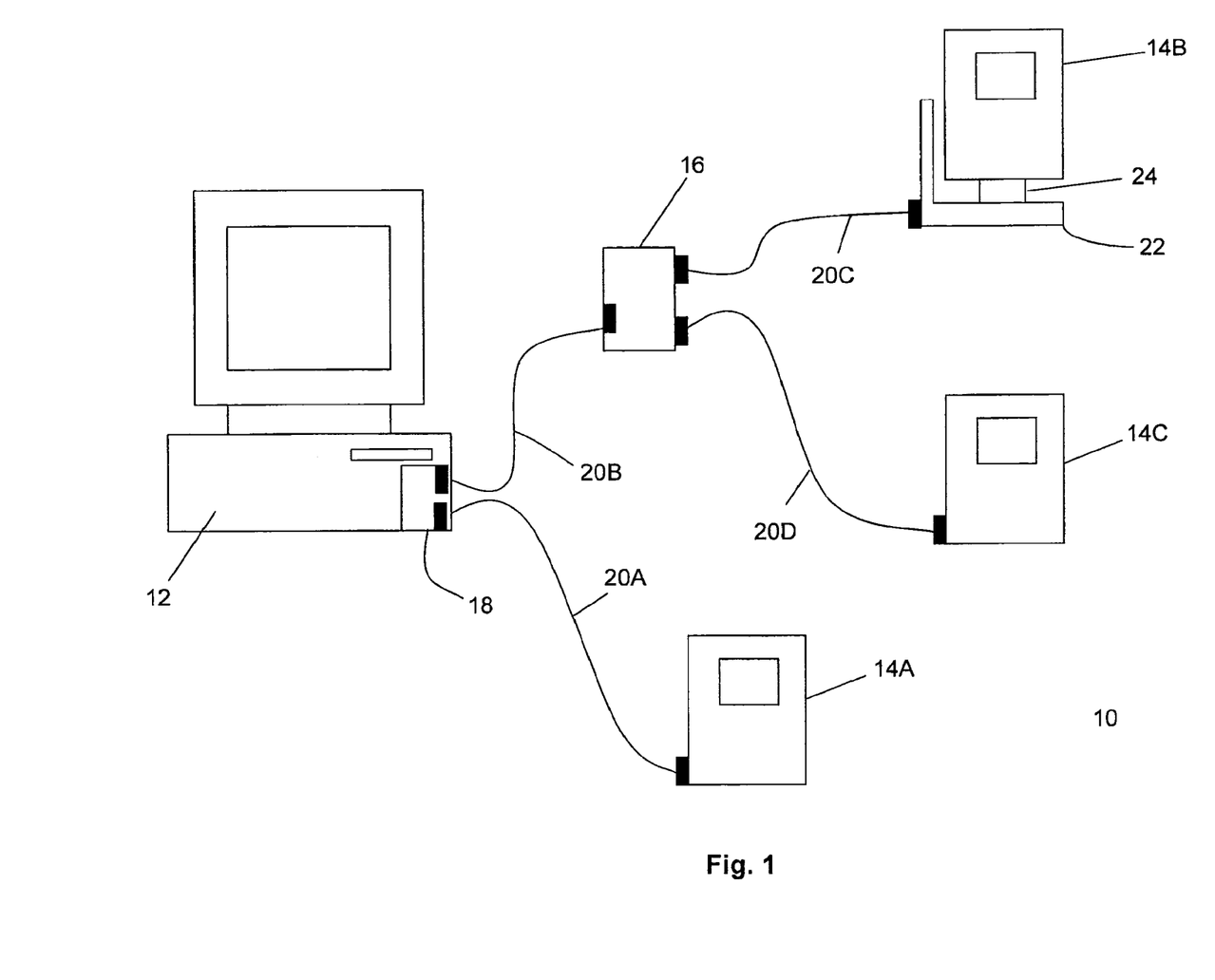
FIG. 1 is a schematic representation of a portable electronic devices having ports connected through a bus to a computer in accordance with an embodiment.

Referring to FIG. 1, an environment 10 of an embodiment has host computer 12 connected to a plurality of portable electronic devices 14, such as cellphones, personal digital assistants (PDAs), portable gaming devices etc. Device 14A is a portable handheld device and connects to host 12 through its port 18 via cable 20A. Devices 14B and 14C are connected to device 12 through a hub 16. Hub 16 is connected to port 18 via cable 20B. Device 14B is connected to an output of port 16 via cable 20C. Device 14C is connected to hub 16 via cable 20C, and hub 16 is connected to port 18 via cable 20D. Device 14B connects to hub 16 through cradle 22 through port 24 on device 14B. While devices 14 are typically powered by internal batteries (not shown) the connections to host 12 allow host 12 to provide a charging voltage to devices 14. In an embodiment, port 18 is a Universal Serial Bus (USB) port.

The USB specification defines electrical, mechanical and operational standards allowing devices to connect with a host through a standardized platform. Briefly, the USB bus is a bi-directional serial interface bus. Data is transmitted using a differential NRZI signals. Data may be transferred at one of three different rates from the host to the connected devices in speeds ranging from 10 Kbps to 480 Mbps: Slow speed mode (10 Kbps to 100 Kbps) is used for devices that have a low data transmission rate, such as a keyboard or a mouse; Full speed mode (500 Kbps to 10 Mbps) is used by more devices; and High speed mode (25 Mbps to 400 Mbps) is provided in USB version 2.0 and provides the highest data communication rate for the current standard. Notably, the High speed mode has certain electrical and mechanical requirements, including use of 45 ohm termination resisters between each data line and ground and minimum voltage and current levels for output signals generated for the High speed mode. It may be necessary to incorporate an additional bus transceiver to provide the required signal levels.

As part of the USB specification, a USB port is allowed to supply power to devices that connect to it. As such, signals provided through port 18 can be used to provide power to device 14. A "high-power" USB port provides a voltage between 4.35-5.25 VDC and a current of at least 500 mA to its connected devices. A "low-power" USB port must be able to provide a voltage between 4.40-5.525 VDC and a current of 100 mA.

One feature of the USB specification allows devices to be connected (or "attached") and disconnected (or "detached") from the USB while either of the host or device is powered. The USB specification has a negotiation protocol that the host and device conduct to enable the host to determine when a new device attaches to the USB or when an attached device is detached from the USB. The USB provides an interrupt signal for reporting these events to the host. When a host is initially booted-up, it polls the root USB hub to determine whether any devices are attached. Thereafter, the host will periodically poll the hub(s) to determine whether any changes in the connected devices occurred.

Generally, when a new device is connected to a host through a USB, the new device must be "enumerated". Per the USB specifications, enumeration determines what device has just been connected and the operating parameters of the device, such as power consumption, number and type of endpoint(s), class of product, etc. Enumeration is a process in which a connection is being established between a device and a host. When a device is being enumerated, the host send a series of requests to the device and the device is expected to reply. A typical enumeration process between a host operating under a Windows (trade-mark) platform and a device may generally be as follows:

a) When a device is first plugged into connected to the USB port of the host, the host detects the device through a new voltage detected on the data lines of the USB. A USB connection circuit on the device provides the new voltage through a circuit providing through one or more pull-up resistor(s) connected to a voltage signal.

b) After allowing time for the plug of the device to be fully inserted into the port and for power to stabilize on the device, the host may issue a reset command through the USB to reset the device to its default state.

c) When the device receives the reset command, it is expected to reply with its address (such as address 0).

d) The host then may attempt to retrieve device descriptor information from the device, through one or more requests.

e) If a sufficient part of the device descriptor is received from the device, the host may issue a command to reset the bus. Thereafter the host may issue a command to set the address of the device. When the device receives the command it is expected to place itself in an "addressed state", per USB protocols.

f) The host then may issue a request to the device for the remaining portion of the device descriptor.

g) Thereafter the host may request configuration and string descriptor data from the device.

For a successful enumeration, the device must respond to each request from the host with any requested information and take any other requested actions. The exchange of commands and replies is encoded in messages generated by the host and device, per USB protocols. It will be appreciated that other enumeration protocols may be used.

One feature of the USB protocol is that a power signal can be provided by the host to its connected devices. As such, the current provided on the USB bus by the host can then be used to power components of the device. If the current in the signal is sufficiently large, the device may be fully activated when connected to the USB. The power may also charge an internal battery of the device.

However, one operating parameter of the USB protocol imposes a current draw limitation on device when it is enumerating with the host. The present current limit is 100 mA. For some devices, they may need to draw more than 100 mA from the host to provide their full operation. Consider a device having a high speed USB controller operating at 480 Mbps and a transceiver generating any necessary USB-compliant signals for the device. When the device is operating in that mode, it may need more than 100 mA to power all of its modules and applications.

Typically, at some point in the enumeration process, the device can indicate to the host via a message that it is "bus-powered" as opposed to "self-powered". Part of the message it can indicate that the device is requesting to draw 500 mA. The host may deny the request, but must provide 100 mA to the device at all times, per the USB standards.

An embodiment provides a bus interface that allows a device to communicate with the host at one of several speeds through different bus modes, depending on the present state of connection of the device with the host and the present operating conditions of the device. Depending on the selected operating speed of the bus, the device may activate different modules, transceivers, internal components and may operate in different states. One mode is (lower) speed mode which bypasses additional hardware and software modules required for USB High speed communications. In the bypass mode, any High speed USB transceivers in the device may not need to be powered and USB bus control may be provided by an internal USB controller on the microprocessor of the device. Further the microprocessor may be able to operate in a lower-power mode. As such, when the device is operating in the bypass mode, it would use less power (and require less current from the USB) than when it would when operating in the High speed mode.

The interface provides detection algorithms and circuits to determine: the operating state of the device, the USB connection state (e.g. whether the device is enumerating or not); and the current presently provided from the USB to the device. As such, while the bus interface is operating in the bypass mode, the interface can monitor for any (predetermined) necessary operating conditions that would allow the bus to operate at a higher speed. When those conditions are detected, the bus interface may change the operating state of the bus to a higher speed mode. In such a higher speed mode, additional circuitry may be activated and internal components of the device may be placed in a higher operating condition.

Similarly, when the bus is operating in a high speed mode, the interface may monitor for any (predetermined) operating conditions that require that the bus operate at a lower speed and make any necessary changes to change the operating speed of the bus to a (suitable) lower speed and to disengage any components that are not needed for that lower speed. It will be appreciated that any number of speeds may be used. It will further be appreciated that other embodiments may be implemented that selectively activate and de-activate components that are related to features other than a bus for the device.

Referring to FIG. 1, during execution of aspects of an embodiment when device 14 initially connects to USB port 18 of host 12 and the device is enumerating with the host, a bus controller in device 14 (not shown) places the USB controller modules of device 14 into a full speed bypass mode. In the bypass mode, the controller activates the internal USB port interface of the microprocessor of device 14, disables the high speed USB transceiver of device 14 and places the microprocessor into a low-power operating mode. During enumeration, signals received by device 14 from host 12 through port 24 are provided directly to the microprocessor. As such, in the full speed bypass mode, all USB signals are handled by the internal USB port on the microprocessor and all data communication exchange rates are set to the limit set for the USB full speed mode. It will be seen that the controller utilizes less power to process signals between port 24 and the microprocessor and the high speed transceiver is not activated, thereby saving further power. It is noted that a typical USB baseband bus transceiver may draw between 10-15 mA of current in normal operation (in the full speed mode). A typical external high speed transceiver draws between 40 mA and 50 mA. As such, more current is conserved, which can be used to charge the battery of device 14, until the USB controller of device 14 can move to the high speed mode.

Once device 14 enumerates with host 12, the embodiment may provide a further status check on the power being provided from the USB. If the controller detects that the current is still being limited, (e.g. to 100 mA), then the controller may keep the bus operating in the full speed bypass mode and divert some of the current to charge the battery of device 12. If the controller detects that there is more current available (e.g. if 500 mA is detected), then that additional current may alternatively be requested by device 14, while maintaining the data rate for the full speed mode. Once a predetermined condition is met (e.g. completion of sufficient charging of battery 342), the embodiment may allow the bus to switch to a higher operating speed. One method of changing the operating speed is to have device 14 re-enumerate to host 12. During the re-enumeration process, the new current availability values may be formally negotiating between device 14 and host 12. Once successful negotiations are complete, the microprocessor may be able to operate in its "normal" operating mode and more (or all) applications on device 14 may be activated. As part of the re-enumeration process, the bus may be set to operate in the USB High speed mode and expect to be able to draw 500 mA current from the USB.

In operation, device 14 may initially set the bus interface to have its USB communications conducted using the full speed bypass mode to a maximum data rate as provided for full speed USB communications. Once the full speed bypass mode has been established and after the battery on device 14 is sufficiently charged, device 14 may initiate negotiations with host 12 to go to the USB High speed mode. Once the High speed mode is set, device 14 may exchange data with host 12 at the data rate provided for High speed USB communications.

An embodiment may additionally or alternatively have device 14 operating the bus at a given speed and then automatically negotiate with host 12 to determine whether the bus should be set at a lower speed. In such an embodiment, device 14 would need to request to disconnect from the USB then re-enumerate to re-establish a connection with the host.

Further detail is now provided on the basic operating components of device 14, followed by a description of specific components more closely related to an embodiment.

Figure 2:
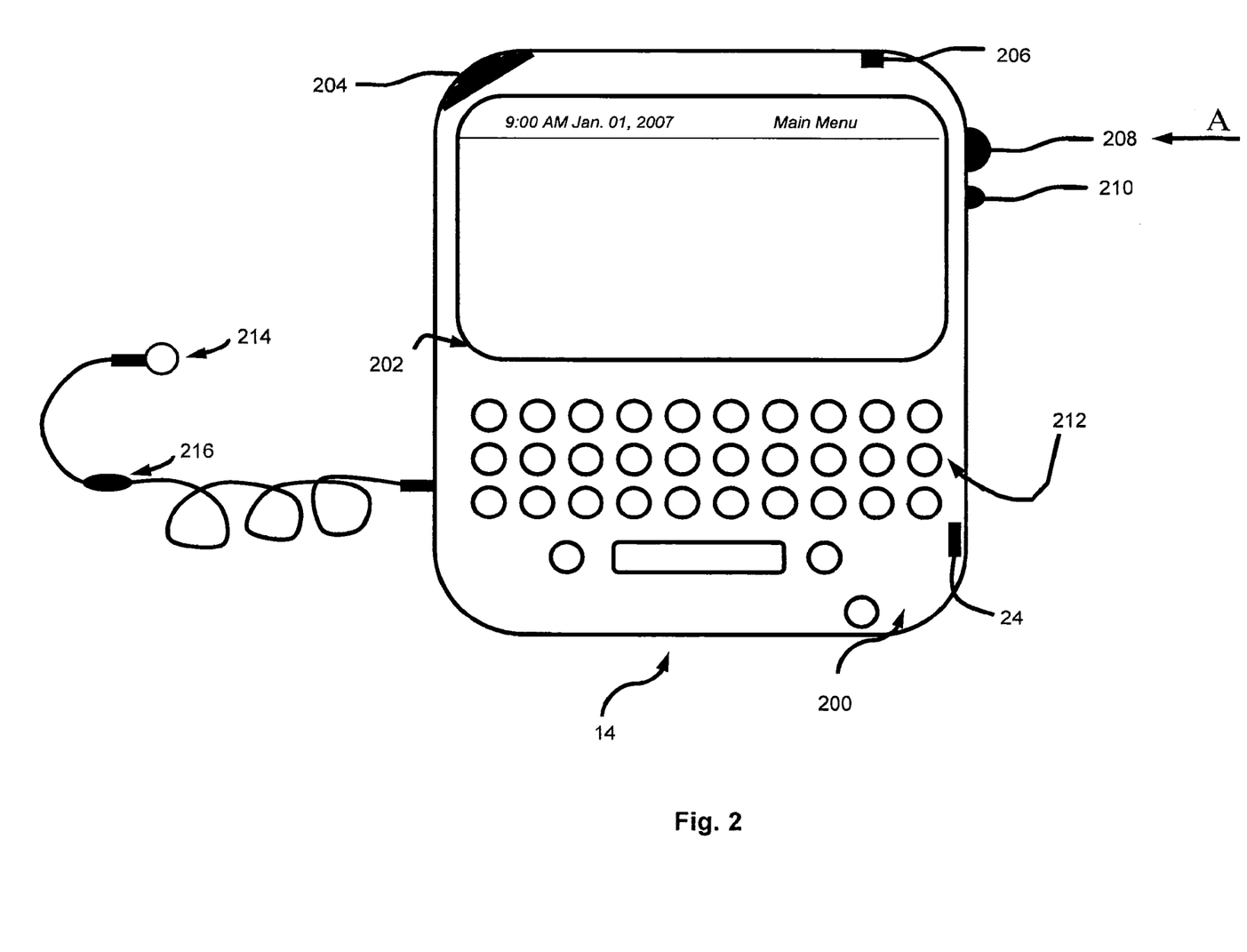
FIG. 2 is a block diagram of one device of FIG. 1 including its port.

FIG. 2 provides general features of electronic device 14 for receiving electronic communications in accordance with an embodiment. Electronic device 14 is based on a computing platform having functionality of an enhanced personal digital assistant with cellphone and e-mail features. It is, however, to be understood that electronic device 14 can be based on construction design and functionality of other electronic devices, such as smart telephones, desktop computers, pagers or laptops having telephony equipment. Device 14 includes a housing 200, an LCD 202, speaker 204, an LED indicator 206, a trackball 208, an ESC ("escape") key 210, keypad 212, a telephone headset comprised of an ear bud 214 and a microphone 216. Trackball 208 and ESC key 210 can be inwardly depressed along the path of arrow "A" as a means to provide additional input to device 14. Port 24 provides a USB interface to either cable 20D or cradle 22.

It will be understood that housing 200 can be made from any suitable material as will occur to those of skill in the art and may be suitably formed to house and hold all components of device 14.

Device 14 is operable to conduct wireless telephone calls, using any known wireless phone system such as a Global System for Mobile Communications (GSM) system, Code Division Multiple Access (CDMA) system, Wideband CDMA/UMTS, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 214 can be used to listen to phone calls and other sound messages and microphone 216 can be used to speak into and input sound messages to device 16.

Figure 3:
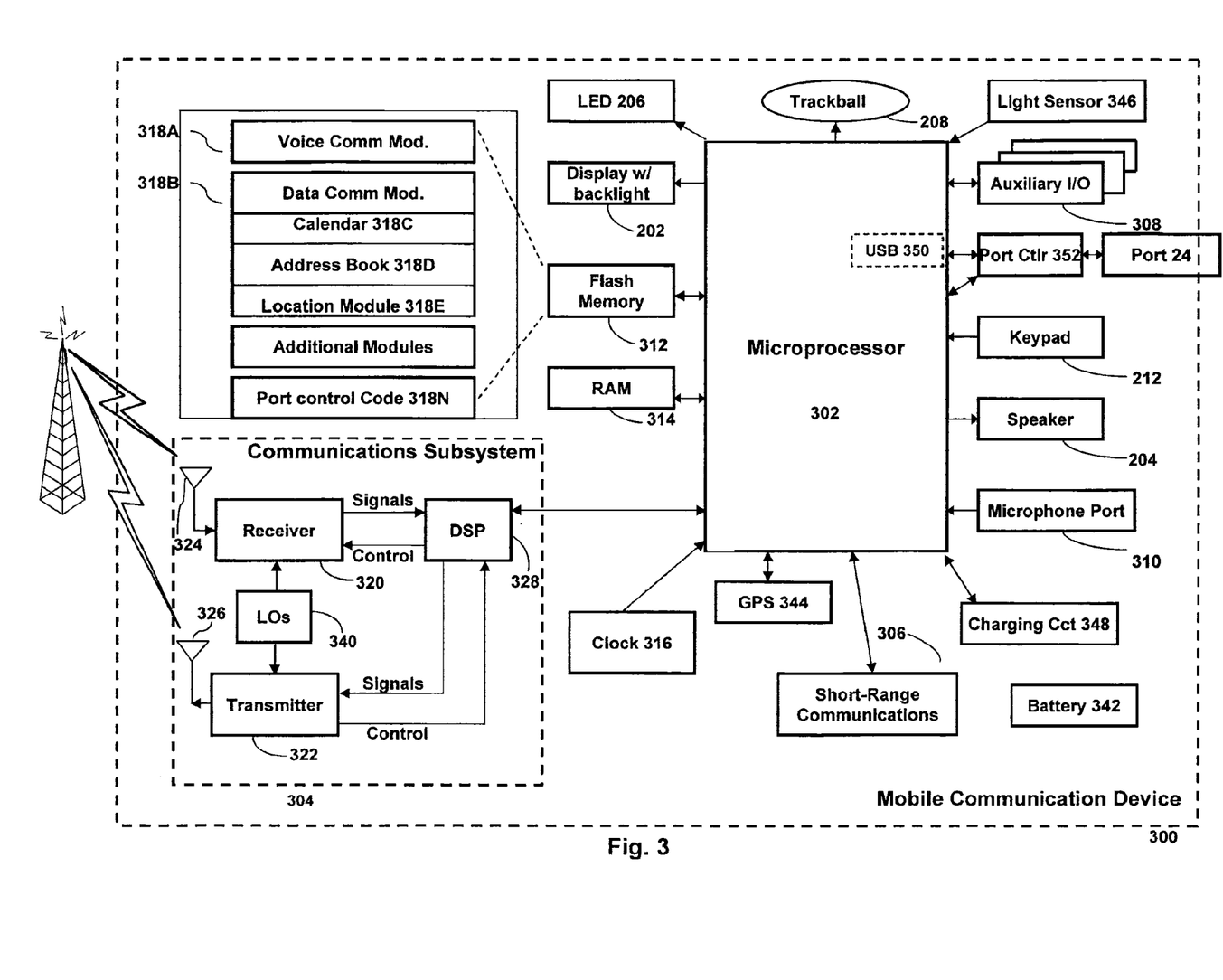
FIG. 3 is a block diagram of internal components of the device of FIG. 2, including its port.

Referring to FIG. 3, functional components of device 14 are provided in schematic 300. The functional components are generally electronic, structural or electro-mechanical devices. In particular, microprocessor 302 is provided to control and receive almost all data, transmissions, inputs and outputs related to device 14. Microprocessor 302 is shown schematically as coupled to keypad 212, port 24 and other internal devices. Microprocessor 302 preferably controls the overall operation of the device 14 and its components. Exemplary microprocessors for microprocessor 302 include Data 950 (trade-mark) series microprocessors, the 6200 series microprocessors and the PXA900 series of microprocessors, all available at one time from Intel Corporation. Microprocessor 302 is connected to other elements in device 14 through a series of electrical connections to its various input and output pins. Microprocessor 302 has an IRQ input line which allows it to receive signals from various devices. Appropriate interrupt firmware is provided which receives and reacts to the signals detected on the IRQ line. Microprocessor 302 may operate in several power modes, including a "normal" mode and a low-power mode. Also, microprocessor 302 may have one or more built-in modules such as a digital to analog converter, an analog to digital converter and a USB bus controller 352.

In addition to the microprocessor 302, other internal components of the device 14 are shown schematically in FIG. 3. These include: display 202; speaker 204; keypad 212; communication sub-system 304; short-range communication sub-system 306; auxiliary I/O devices 308; port 24; microphone port 310 for microphone 216; flash memory 312 (which provides persistent storage of data); random access memory (RAM) 314; clock 316 and other device sub-systems (not shown). Device 14 is preferably a two-way radio frequency (RF) communication device having voice and data communication capabilities. In addition, device 14 preferably has the capability to communicate with other computer systems via the Internet.

Port 24 provides a physical connection interface to cable 20D and/or cradle 22. Port 24 also comprises an interface circuit to selectively connect and disconnect and control signals that pass between microprocessor 302 and the connection interface. Further detail on port 24 is provided below.

Operating system software executed by the microprocessor 302 is preferably stored in a computer-readable medium, such as flash memory 312, but may be stored in other types of memory devices, such as read-only memory (ROM) or similar storage element. In addition, system software, specific device applications, or parts thereof, may be temporarily loaded into a volatile store, such as RAM 314. Communication signals received by device 14 may also be stored to RAM 314.

Microprocessor 302, in addition to its operating system functions, enables execution of software applications on device 14. A set of software (or firmware) applications, generally identified as applications 318, that control basic device operations, such as voice communication module 318A and data communication module 318B, may be installed on the device 14 during manufacture or downloaded thereafter. As well, software modules, such as calendar module 318C, address book 318D and location module 318E. Additional modules such as personal information manager (PIM) application may be provided. Any module may be installed during manufacture or downloaded thereafter into device 14. Data associated with each application can be stored in flash memory 312. Also, Port Control Code 318N is provided to control operation of device 14 and its internal bus connections with port 24 when device 14 is connected to host 12. Further detail on Port Control Code 318N is provided below.

Communication functions, including data and voice communications, are performed through the communication sub-system 304 and the short-range communication sub-system 306. Systems 304 and 306 may be selectively activated and not activated depending on the current state of device 14. For example, if device 14 is in a low-power mode, then either or both of systems 304 and 306 may be not activated. Activation of both systems 304 and 306 may be controlled by software, including any module 318. Collectively, sub-systems 304 and 306 provide the signal-level interface for all communication technologies processed by device 14. Various applications 318 provide the operational controls to further process and log the communications. Communication sub-system 304 includes receiver 320, transmitter 322 and one or more antennas, illustrated as receive antenna 324 and transmit antenna 326. In addition, communication sub-system 304 also includes processing modules, such as digital signal processor (DSP) 328 and local oscillators (LOs) 340. The specific design and implementation of communication sub-system 304 is dependent upon the communication network in which device 14 is intended to operate. For example, communication sub-system 304 of device 14 may operate with the Mobitex™, DataTAC™ or General Packet Radio Service (GPRS)

mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 14. In any event, communication sub-system 304 provides device 14 with the capability of communicating with other devices using various communication technologies, including instant messaging (IM) systems, text messaging (TM) systems and short message service (SMS) systems.

In addition to processing communication signals, DSP 328 provides control of receiver 320 and transmitter 322. For example, gains applied to communication signals in receiver 320 and transmitter 322 may be adaptively controlled through automatic gain-control algorithms implemented in DSP 328.

In a data communication mode, a received signal, such as a text message or Web page download, is processed by the communication sub-system 304 and is provided as an input to microprocessor 302. The received signal is then further processed by microprocessor 302 which can then generate an output to display 202 or to an auxiliary I/O device 308. A device user may also compose data items, such as e-mail messages, using keypad 212, trackball 208 and/or some other auxiliary I/O device 308, such as a touchpad, a rocker switch, a trackball or some other input device. The composed data items may then be transmitted over a communication network via communication sub-system 304. Sub-system 304 may also detect when it is out of communication range for its remote systems.

In a voice communication mode, overall operation of device 14 is substantially similar to the data communication mode, except that received signals are output to speaker 204, and signals for transmission are generated by microphone 216. Alternative voice or audio I/O sub-systems, such as a voice message recording sub-system, may also be implemented on device 14. In addition, display 202 may also be utilized in voice communication mode, for example, to display the identity of a calling party, the duration of a voice call, or other voice call-related information.

Short-range communication sub-system 306 enables communication between device 14 and other proximate systems or devices, which need not necessarily be similar devices. For example, the short-range communication sub-system may include an infrared device and associated circuits and components, or a Bluetooth™ communication module to provide for communication with similarly enabled systems and devices.

Device 14 may also have global positioning system 344 to assist in identifying a present location of device 14 and may also have light sensor 346 to provide data on the ambient light conditions for device 14. These elements may be controlled by software operating on device 14 as described earlier.

Powering the entire electronics of the mobile handheld communication device is power source 342. In one embodiment, the power source 342 includes one or more batteries. In another embodiment, the power source 342 is a single battery pack, especially a rechargeable battery pack. A power switch (not shown) provides an "on/off" switch for device 14. Battery charging circuit 348 provides a hardware interface to allow external power to be selectively provided to device 14. Such power may be provided through signals received in port 24. The charging circuit may be able to detect the present level of charge on battery 342 and determine whether battery 342 is sufficiently charged. A sufficient level of charge can differ among devices and batteries. Determining a level of charge may be implemented using circuits and techniques known in the art. A power source interface (not shown) may be provided in hardware, firmware, software or a combination of such elements to selectively control access of components in device 14 to power source 342. Upon activation of the power switch an application 318 is initiated to turn on device 14. Upon deactivation of the power switch, an application 318 is initiated to turn off device 14. Power to device 14 may also be controlled by other devices and by software applications 318.

Port 24 provides signals from connector 20 to microprocessor 302 through port controller 352. As is described further below, controller 352 selectively engages a bus transceiver when device 14 is operating in a high speed mode for USB signals. Controller also communicates with internal USB port 350 in microprocessor 302. USB port 350 can selectively communicate directly with port 24, as controlled by controller 352.

Further detail is now provided on specific components of device 14 as they relate to an embodiment. First, detail is provided on the bus interface and the controller for device 14 for port 24 and Port Control Code 318N.

Figure 4:
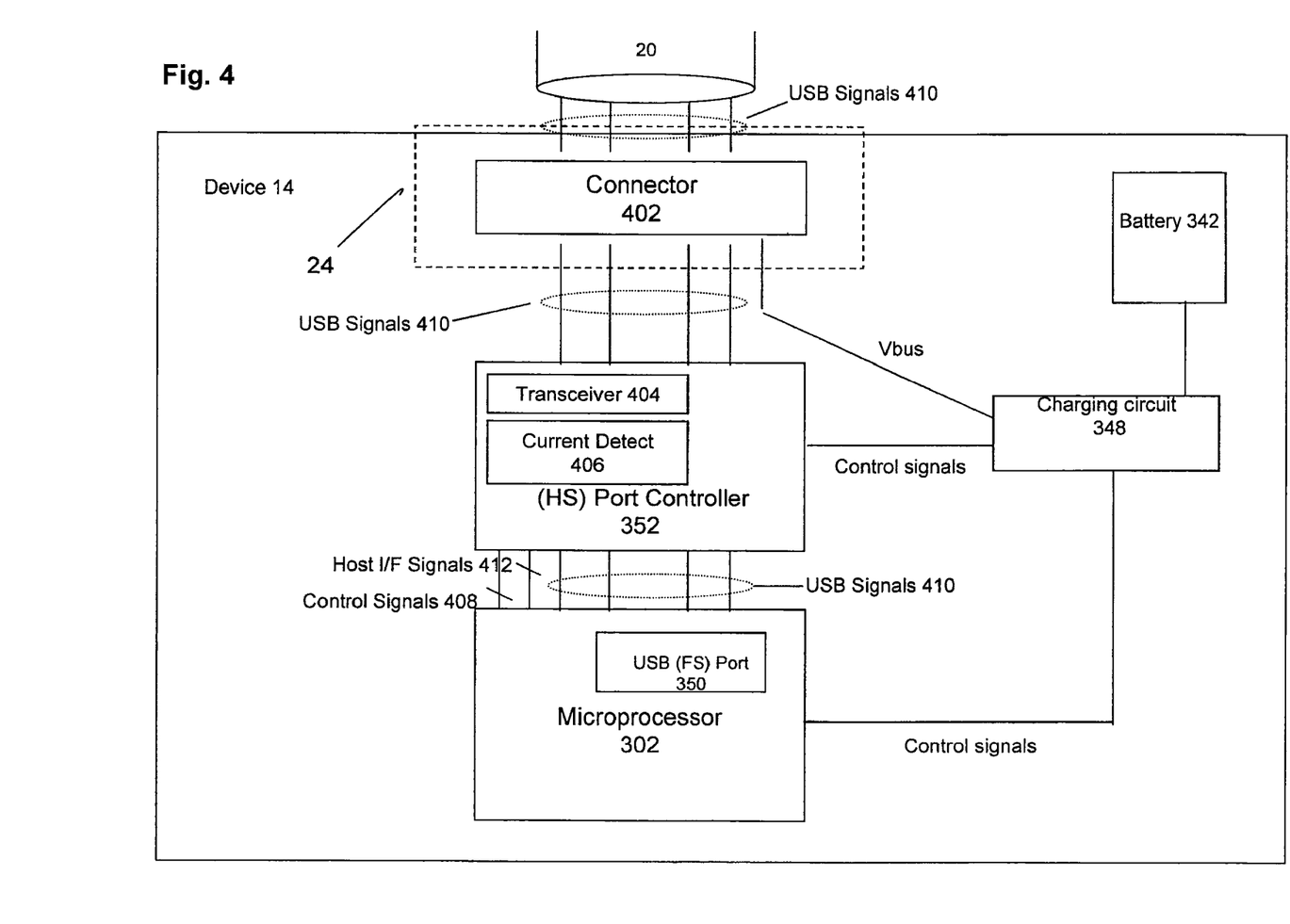
FIG. 4 is a block diagram of internal components of the port of FIG. 3.

FIG. 4 shows diagram 400 of components of device 14 including port 24 and internal components that process signals carried thereon. Connector 402 is part of port 24 and provides a physical connector for cable 20 to device 14. USB signals 410 are provided between connector 402 and microprocessor 302. Controller 352 provides control logic to selectively make signalling connections between microprocessor 302 and port 24 for USB signals 410. Microprocessor 302 is controlled, in part by Port Control Code 318N. Data and control signals received by microprocessor 302 through USB signals 410 allow an embodiment to determine the present state of connection of device 14 to host 12. As such, an embodiment can then cause microprocessor 302 to selectively generate: control signals 408 to control one or more of controller 352 (and its elements); host interface signals 412 and USB signals 410 to communicate with host 14. It will be appreciated that there is a separate data path between the host and controller 352 aside from the USB connection. The USB path allows the (full speed) USB port 350 to be "routed through" (high speed) port controller 352. In such a "routed through" state, it will be typical that much of the circuitry in controller 352 would not be powered. USB signals 410 from microprocessor 302 are processed either by USB port 350 alone or by port 350 with transceiver 404, depending on the state of operation of the USB for device 14. Power and control is also provided to charging circuit 348, which selectively provides either the 100 mA signal or the 500 mA signal to a charging circuit that charges battery 342. The battery may be charged to any sufficient predetermined level by circuit 348 depending on its design. Circuit 348 receives a Vbus signal from connector 402 and control signals from controller 352 and microprocessor 302.

Within controller 352, transceiver circuit 404 is provided to selectively amplify signals from microprocessor 302 destined to port 24. Transceiver 404 may include USB bus logic to allow it to generate USB compliant signals based on signals 408 received from microprocessor 302. Current detect circuit 406 provides electronic circuits allowing controller 352 to determine the level of current and/or voltage present in USB signals 410. The controller may have a digital memory (endpoint RAM) interface for the host, a phase-locked loop to generate a clock for controller 352 and encoders and decoders for NRZI signalling conversion, in addition to USB bypass routing logic. The controller has logic to selectively charge battery through charging circuit 348 at either 100 mA or 500 mA based on a charging message received by the device from the host indicating what is available.

Further detail is now provided on Port Control Code 318N as it controls elements of device 14.

Figure 5:
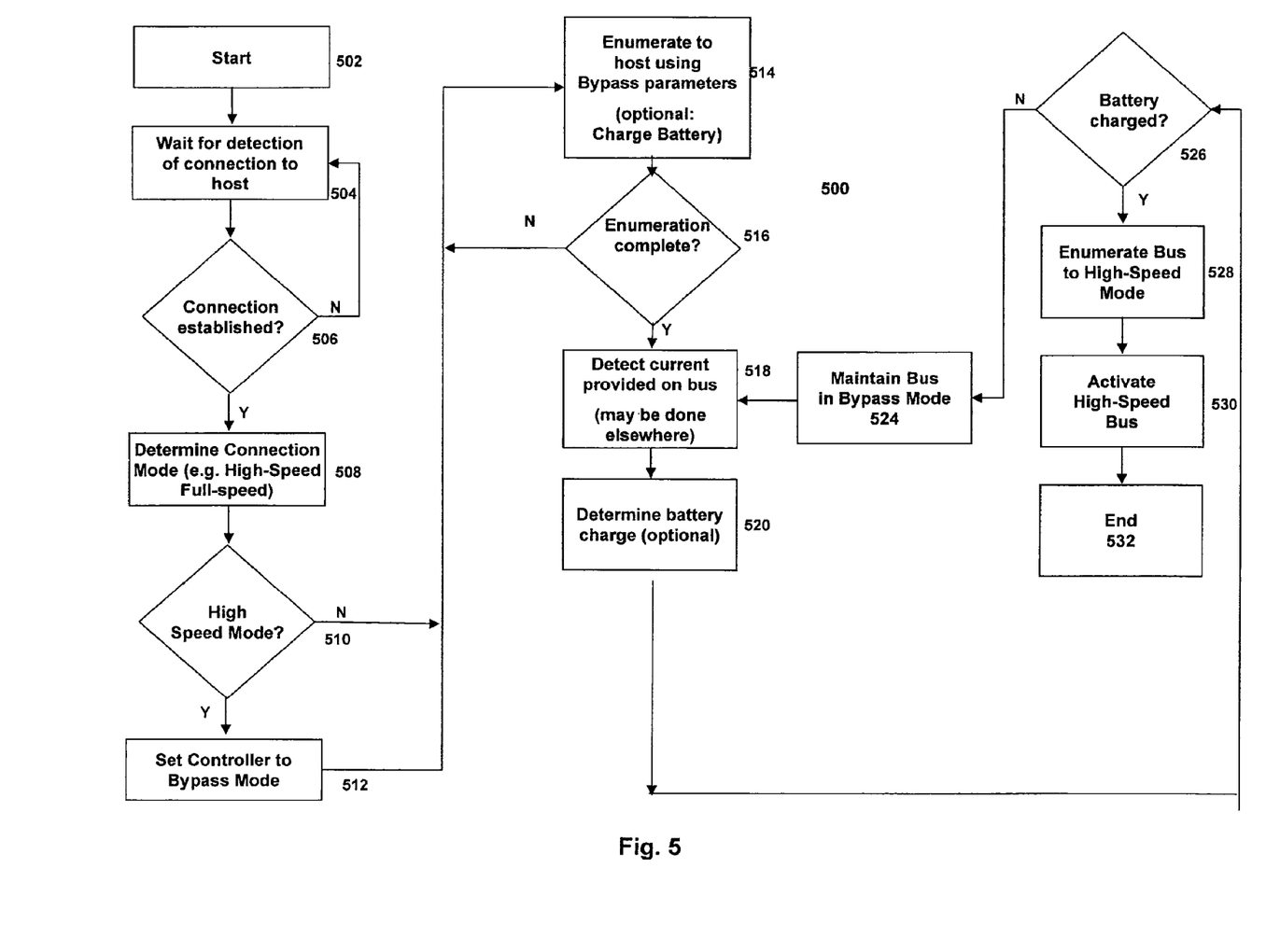
FIG. 5 is a flowchart of exemplary steps executed by an embodiment of in providing power to the device of FIG. 2.

Referring to FIG. 5, flow chart 500 shows an exemplary process used to control operation of the USB bus and controller 352 for device 14 through Port Control Code 318N. Overall, code 318N operates on device 14 and controls port controller 352, internal USB port 350 and charging circuit 348.

At block 502, Port Control Code 318N starts. Initiation of Code 318N may be automatically executed on startup of device 14 or upon detection of a connection being established through port 24 (FIG. 4). At step 504, the process waits for detection of a connection to host 12.

Next, at test block 506, the signals on USB signals 410 are monitored to determine whether if a connection has been detected. If no connection has been detected, then the process returns to step 504. If a connection has been detected, the process moves to step 508, where a transmission mode for the bus is determined, based on USB signals 410 as processed by Code 318N. For example, the connection may be: a high-speed, a full-speed, a low-speed connection, high-impedance or a different connection. The type of connection may be determined from signals received from host 12 or by evaluating the physical characteristics of the signals (e.g. the current, using current detect module 406). As such, at test 510, the process evaluates whether the connection is a high speed connection. If it is, the process moves to step 512 where the controller is set to a full speed bypass mode. In other embodiments, the default may be to simply force device 14 into the bypass mode. If test 510 is conducted and if it determines that the present USB connection is not a high speed connection, then the process moves directly from test 510 to step 514.

After the bypass mode is set, the process moves to step 514 where an enumeration process is started with the host. During enumeration, Code 318N may generate messages destined for host 12 through port 24 that device 14 is operating in a full speed mode (i.e. the bypass mode).

Optionally, if any current is available through USB signals 410 for charging battery 342 through charging circuit 348, then the battery is charged. Code 318N may selectively activate current detect module 406 to determine the level of current of USB signals 410 and then selectively activate charging circuit 348 (FIG. 3) to charge battery 342. Alternatively or additionally, such information may be derived from the contents of USB signals 410 from host 12. Circuit 348 may provide a "charge" signal which is detected by microprocessor 302 and as such Code 318N. Upon detection of any "charge" signal, the charging process may be stopped.

Next, at test 516, the process detects whether the enumeration is complete. If it is not complete then the test return to step 514 to complete the enumeration. If the enumeration is complete, the process moves to step 518, where the current provided on the bus is detected using Code 318N to evaluate data provided by either current detector circuit 406 or messages provided from host 14. In some instances, host-side drivers may inform the device of what the available current is on the port that the device is connected to. This may be done through a setup message sent during enumeration. As such in some instances, the step 518 may be conducted elsewhere in the process.

Thereafter, the process moves to step 520 where the charge on the battery is determined. This charge may be evaluated by charging circuit 348. This step is optional and it may be conducted as part of step 514.

Then the process moves to step 526 where a test is made to determine whether there is a sufficient charge on battery 342. If the battery is not charged then the process returns to step 524 to maintain the bus in full speed bypass mode. However, if the battery is charged, then the process 500 moves to step 528, where the bus is re-enumerated to a high speed mode. At this point, the following test can also be done: if the re-enumeration is not successful (e.g. the host rejects the connect at the high speed mode and instead offers the full speed mode), then the system returns to the bypass mode. Thereafter if re-enumeration is complete and successful, the bus is activated at the high speed level. This may include activating transceiver 504. The next step is the end of the process.

Alternatively, once an embodiment sets the full speed bypass mode for device 14, if either 100 mA or 500 mA is available from host 12, device 14 may issue a USB command to accepts signals being transmitted at either current level. However, the data rate would remain limited to the ranges provided by the Full speed USB standard.

It will be appreciated that this process may be initiated upon the detection of a connection, as provided in step 504. However, in other embodiments other external conditions may trigger the activation of the process 500. For example, the process may be restarted if the current is detected to drop to 100 mA, i.e. the bus drops down to a full speed mode. It will be appreciated that this process 500 utilizes signals from microprocessor 302 and Port Control Code 318N.

In another embodiment, an algorithm may be implemented in Port Control Code 318N to control management of a captive USB bus from a full speed mode to a high speed mode as follows. First, device 14 boots up with a USB cable connected to host 12. Next device 14 simulates an "attachment" to host 12 through a USB signal and device 14 identifies itself to host 12 as a full-speed capable (but not high speed capable) device.

Once host 12 receives and interprets this identification, host 12 initiates an USB enumeration process with device 14. As part of the enumeration process, host 12 sets the USB configuration for device 14 to allow device 14 to terminate the enumeration process.

Next, a test is made at device 14 to determine whether device 14 has sufficient power to operate in the USB high speed mode. If it does not, then device 14 may initiate any appropriate action to meet the power requirements, reset and then return to the boot up step. If device 14 has sufficient power, then through signal(s) provided by the device on the USB, device 14: simulates a detach from the USB; simulates an attach; and identifies itself to host 12 as being high speed capable. At that time, host 12 initiates an enumeration process and sets the USB configuration for device 14 to allow device 14 to terminate the enumeration process. At that time, device 14 is enumerated at the high speed mode. As noted earlier, all steps are executed through command and control signals generated by Port Control Code 318N and provided to USB and other elements in device 14.

As a complementary process, Port Control Code 318N has a separate process to manage and control negotiation of its USB from being enumerated at a high speed mode to a full speed mode. For this process, device 14 starts as being enumerated at the high speed mode. Next, a test is periodically conducted to determine if device 14 needs to down grade to the full speed mode. Different conditions may be set that require the downgrade. Conditions may include: current power state, current time, current location or other criteria. If the results of the test indicates that device 14 should remain at high speed mode, it continues to operate at that mode. However, if the results indicate that a downgrade should be performed, then device 14 simulates a detach and then an attach to the USB. Next, device 14 identifies itself to host 12 as being full-speed capable (but not high speed capable). Once host 12 receives and interprets this identification, host 12 initiates an USB enumeration process with device 14. As part of the enumeration process, host 12 sets the USB configuration for device 14 to allow device 14 to terminate the enumeration process and finally device 14 is enumerated a full speed.

It will be appreciated that the Port Control Code 318N and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Different signalling techniques may be used to communicate information between applications using known programming techniques. Known data storage, access and update algorithms allow data to be shared between applications. For example, detection or completion of an event described in FIG. 5 or any process executing on device 14 may cause an interrupt to be generated on microprocessor 302 and a particular interrupt routine may be provided to process the event. It will further be appreciated that other applications and systems on device 14 may be executing concurrently with Code 318N. As such, Code 318N may be structured to operate in as a "background" application on device 14, using programming techniques known in the art.

While an embodiment has been described where a bus is selectively operated in different modes while device 14 is enumerating with host 12, it will be appreciated that other comparable embodiments may be implemented to operate independently from whether or not device 14 is enumerating. Also an embodiment may be directed to a USB protocol or a different bus architecture. Further, other embodiments may provide selective activation and deactivation of other components to conserve power, depending on the present operating environment of device 14. For example, during a powering cycle, communication subsystems 304 and 306 may be temporarily not powered.

It will be appreciated that other embodiments may incorporate wireless connections and charging systems.

The present invention is defined by the claims appended hereto, with the foregoing description being merely illustrative of embodiments of the invention. Those of ordinary skill may envisage certain modifications to the foregoing embodiments which, although not explicitly discussed herein, do not depart from the scope of the invention, as defined by the appended claims.

The invention claimed is:

1. A method for controlling interfacing parameters for a device through a microprocessor in the device having a first bus controller and a second bus controller external to said microprocessor when connected to a host, comprising:
    establishing an initial connection by said device to said host;
    conducting negotiations from said device to said host to set a first data transmission rate for said device for said initial connection utilizing said first bus controller; and
    after detecting at least one predetermined condition, re-establishing said connection with said host using said second bus controller that processes said communications at a second transmission rate that is higher said first data transmission rate.

2. The method for controlling interfacing parameters for a device as claimed in claim 1, wherein:
    said microprocessor is selectably operatable in a first power mode and a second power mode that consumes more power than said first power mode; and while said device is establishing said connection
    signals from said connection are used to charge a battery of said device; and
    said microprocessor operates in said first power mode.

3. The method for controlling interfacing parameters for a device as claimed in claim 2, wherein said at least one predetermined condition is charging of said battery to a predetermined level.

4. The method for controlling interfacing parameters for a device as claimed in claim 3, wherein when said connection is re-established, said microprocessor operates in said second power mode rather than said first power mode.

5. The method for controlling interfacing parameters for a device as claimed in claim 4, wherein:
    said bus is a Universal Serial Bus (USB) bus;
    said first data transmission rate is a full speed USB rate;
    said at least one predetermined condition includes completion of enumeration of said device to said host; and
    said second data transmission rate is a high speed USB rate.

6. The method for controlling interfacing parameters for a device as claimed in claim 3, further comprising:
    monitoring an electrical current between said host and said device as said battery is being recharged;
    utilizing a portion of said electrical current to charge said battery; and
    if said electrical current increases and if said predetermined level is not yet reached, then increasing said portion to charge said battery.

7. The method for controlling interfacing parameters for a device as claimed in claim 1, wherein said negotiations comprise:
    initiating a command to simulate an attachment to said host; and
    identifying said device to said host as being capable of communicating at said first data transmission rate.

8. The method for controlling interfacing parameters for a device as claimed in claim 7, wherein said negotiations further comprise initiating at said host an enumeration process with said device by establishing a configuration for said device to allow said device to terminate the enumeration process.

9. The method for controlling interfacing parameters for a device as claimed in claim 8, wherein if said predetermined condition is satisfied said device:
    initiates a command to simulate a detachment from said host;
    initiates a command to simulate an attachment to said host; and
    identifies itself to said host as being capable of communicating at said second data transmission rate.

10. The method for controlling interfacing parameters for a device as claimed in claim 9, further comprising a second process to enumerate said connection from said second data transmission rate to said first data transmission rate, said second process initiated upon satisfaction of a second predetermined condition.

11. The method for controlling interfacing parameters for a device as claimed in claim 10, wherein said second process comprises:
    initiating a command to simulate a detachment by said device from said host;
    initiating a command to simulate an attachment to said host; and identifying said device to said host as being capable of communicating at said first data transmission rate.

12. A system for interfacing communications for a device when connected to a host, comprising:
- a microprocessor having a first bus controller to process said communications between said device and said host at a first data transmission rate;
- a second bus controller external to said microprocessor to process said communications a second transmission rate that is higher said first data transmission rate;
- a module to monitor for an initial connection by said device to said host; and
- a controller module that activates said first bus controller in said microprocessor while said device is establishing said connection with said host and after at least one predetermined condition, activates said second bus controller.

13. The system for interfacing communications for a device as claimed in claim 12, further comprising a battery charging module to charge a battery powering said device, wherein said microprocessor is selectably operatable in a first power mode and a second power mode that consumes more power than said first power mode and while said device is establishing said connection, signals from said connection are used to charge said battery of said device and said microprocessor operates in said first power mode.

14. The system for interfacing communications for a device as claimed in claim 12, wherein said at least one predetermined condition is the charging of said battery to a predetermined level and when said connection is re-established, said microprocessor operates at said second power mode than said first power mode.

15. The system for interfacing communications for a device as claimed in claim 14, wherein:
- said bus is a Universal Serial Bus (USB) bus;
- said first data transmission rate is a full speed USB rate;
- said at least one predetermined condition includes completion of enumeration of said device to said host; and
- said second data transmission rate is a high speed USB rate.

16. The system for interfacing communications for a device as claimed in claim 15, wherein said controller module initiates negotiations comprising:
- initiating a command to simulate an attachment to said host; and
- identifying said device to said host as being capable of communicating at said first data transmission rate.

17. The system for interfacing communications for a device as claimed in claim 16, wherein said negotiations further comprise initiating at said host an enumeration process with said device by establishing a configuration for said device to allow said device to terminate the enumeration process.

18. The system for interfacing communications for a device as claimed in claim 17, wherein if said predetermined condition is satisfied said controller module:
- initiates a command to simulate a detachment from said host;
- initiates a command to simulate an attachment to said host; and
- identifies said device to said host as being capable of communicating at said second data transmission rate.

19. The system for interfacing communications for a device as claimed in claim 18, wherein said controller module further initiates a second process to enumerate said connection from said second data transmission rate to said first data transmission rate, said second process initiated upon satisfaction of a second predetermined condition.

20. The system for interfacing communications for a device as claimed in claim 19, wherein said second process comprises:
- initiating a command to simulate a detachment by said device from said host;
- initiating a command to simulate an attachment to said host; and
- identifying said device to said host as being capable of communicating at said first data transmission rate.

* * * * *